United States Patent
Au et al.

(10) Patent No.: US 7,246,300 B1
(45) Date of Patent: Jul. 17, 2007

(54) SEQUENTIAL FLOW-CONTROL AND FIFO MEMORY DEVICES HAVING ERROR DETECTION AND CORRECTION CAPABILITY WITH DIAGNOSTIC BIT GENERATION

(75) Inventors: Mario Au, Fremont, CA (US); Jiann-Jeng Duh, San Jose, CA (US)

(73) Assignee: Integrated Device Technology Inc., San Jose, CA (US)

( * ) Notice: Subject to any disclaimer, the term of this patent is extended or adjusted under 35 U.S.C. 154(b) by 504 days.

(21) Appl. No.: 10/912,938

(22) Filed: Aug. 6, 2004

(51) Int. Cl.
*H03M 13/00* (2006.01)

(52) U.S. Cl. .................... 714/758; 714/763

(58) Field of Classification Search ........... 714/763, 714/758
See application file for complete search history.

(56) References Cited

U.S. PATENT DOCUMENTS

| | | | |
|---|---|---|---|
| 4,493,081 A | 1/1985 | Schmidt | |
| 4,888,741 A | 12/1989 | Malinowski | |
| 5,371,708 A | 12/1994 | Kobayashi | |
| 5,442,747 A | 8/1995 | Chan et al. | |
| 5,546,347 A | 8/1996 | Ko et al. | |
| 5,590,272 A * | 12/1996 | Murata et al. | 714/2 |
| 5,884,067 A | 3/1999 | Storm et al. | |
| 6,003,144 A * | 12/1999 | Olarig et al. | 714/42 |
| 6,173,425 B1 | 1/2001 | Knaack et al. | |
| 6,259,648 B1 | 7/2001 | Kragick | |
| 6,366,529 B1 | 4/2002 | Williams et al. | |
| 6,460,157 B1 | 10/2002 | Chen et al. | |
| 6,546,461 B1 | 4/2003 | Au et al. | |
| 6,557,053 B1 | 4/2003 | Bass et al. | |
| 6,754,777 B1 | 6/2004 | Au et al. | |
| 2002/0184579 A1 | 12/2002 | Alvarez, II et al. | |
| 2004/0001269 A1 | 1/2004 | Itou et al. | |
| 2004/0003336 A1 | 1/2004 | Cypher | |
| 2004/0019743 A1 | 1/2004 | Au et al. | |
| 2004/0047209 A1 | 3/2004 | Lien et al. | |
| 2004/0088636 A1 | 5/2004 | Cypher | |
| 2004/0243784 A1 * | 12/2004 | Singh | 711/173 |

* cited by examiner

*Primary Examiner*—Guy Lamarre
*Assistant Examiner*—Esaw Abraham
(74) *Attorney, Agent, or Firm*—Myers Bigel Sibley & Sajovec PA

(57) ABSTRACT

FIFO memory devices include a multi-port cache memory device configured to generate a data word along with a plurality of diagnostic bits. These diagnostics bits encode an error correction status of the data word and a path traversal status of the data word through the FIFO memory device. In particular, the diagnostic bits identify all cases of whether the data word includes a corrected or uncorrected error, is without error or is unchecked for errors because the data word did not pass through error detection and correction circuitry within the FIFO memory device.

6 Claims, 2 Drawing Sheets

SEQUENTIAL FLOW-CONTROL AND FIFO MEMORY DEVICES HAVING ERROR DETECTION AND CORRECTION CAPABILITY WITH DIAGNOSTIC BIT GENERATION

CROSS-REFERENCE TO RELATED APPLICATIONS

This application is related to U.S. application Ser. No. 10/612,849, filed Jul. 3, 2003; Ser. No. 10/613,246, filed Jul. 3, 2003; Ser. No. 10/639,163, filed Aug. 11, 2003; and Ser. No. 10/721,974, filed Nov. 24, 2003, the disclosures of which are hereby incorporated herein by reference.

FIELD OF THE INVENTION

The present invention relates to integrated circuit memory devices and methods of operating same, and more particularly to buffer memory devices and methods of operating buffer memory devices.

BACKGROUND OF THE INVENTION

Semiconductor memory devices can typically be classified on the basis of memory functionality, data access patterns and the nature of the data storage mechanism. For example, distinctions are typically made between read-only memory (ROM) devices and read-write memory (RWM) devices. The RWM devices typically have the advantage of offering both read and write functionality with comparable data access times. Typically, in RWM devices, data is stored either in flip-flops for "static" memory devices or as preset levels of charge on a capacitor in "dynamic" memory devices. As will be understood by those skilled in the art, static memory devices retain their data as long as a supply of power is maintained, however, dynamic memory devices require periodic data refreshing to compensate for potential charge leakage. Because RWM devices use active circuitry to store data, they belong to a class of memory devices known as "volatile" memory devices because data stored therein will be lost upon termination of the power supply. ROM devices, on the other hand, may encode data into circuit topology (e.g., by blowing fuses, removing diodes, etc.). Since this latter type of data storage may be hardwired, the data cannot be modified, but can only be read. ROM devices typically belong to a class of memory devices known as "nonvolatile" memory devices because data stored therein will typically not be lost upon termination of the power supply. Other types of memory devices that have been more recently developed are typically referred to as non-volatile read-write (NVRWM) memory devices. These types of memory devices include EPROM (erasable programmable read-only memory), E²PROM (electrically erasable programmable read-only memory), and flash memories, for example.

An additional memory classification is typically based on the order in which data can be accessed. Here, most memory devices belong to the random-access class, which means that memory locations can be read from or written to in random order, typically by supplying a read or write address. Notwithstanding the fact that most memory devices provide random-access, typically only random-access RWM memories use the acronym RAM. Alternatively, memory devices may restrict the order of data access to achieve shorter data access times, reduce layout area and/or provide specialized functionality. Examples of such specialized memory devices include buffer memory devices such as first-in first-out (FIFO) memory devices, last-in first-out (LIFO or "stack") memory devices, shift registers and content addressable memory (CAM) devices.

A final classification of semiconductor memories is based on the number of input and output ports associated with the memory cells therein. For example, although most memory devices have unit cells therein that provide only a single port which is shared to provide an input and output path for the transfer of data, memory devices with higher bandwidth requirements often have cells therein with multiple input and output ports. However, the addition of ports to individual memory cells typically increases the complexity and layout area requirements for these higher bandwidth memory devices.

Single-port memory devices are typically made using static RAM cells if fast data access times are requiring, and dynamic RAM cells if low cost is a primary requirement. Many FIFO memory devices use dual-port RAM-based designs with self-incrementing internal read and write pointers to achieve fast fall-through capability. As will be understood by those skilled in the art, fall-through capability is typically measured as the time elapsing between the end of a write cycle into a previously empty FIFO and the time an operation to read that data may begin. Exemplary FIFO memory devices are more fully described and illustrated at section 2.2.7 of a textbook by A. K. Sharma entitled "Semiconductor Memories: Technology, Testing and Reliability", IEEE Press (1997).

In particular, dual-port SRAM-based FIFOs typically utilize separate read and write pointers to advantageously allow read and write operations to occur independently of each other and achieve fast fall-through capability since data written into a dual-port SRAM FIFO can be immediately accessed for reading. Since these read and write operations may occur independently, independent read and write clocks having different frequencies may be provided to enable the FIFO to act as a buffer between peripheral devices operating at different rates. Unfortunately, a major disadvantage of typical dual-port SRAM-based FIFOs is the relatively large unit cell size for each dual-port SRAM cell therein. Thus, for a given semiconductor chip size, dual-port buffer memory devices typically provide less memory capacity relative to single-port buffer memory devices. For example, using a standard DRAM cell as a reference unit cell consuming one (1) unit of area, a single-port SRAM unit cell typically may consume four (4) units of area and a dual-port SRAM unit cell typically may consume sixteen (16) units of area. Moreover, the relatively large unit cells of a dual-port SRAM FIFO may limit the degree to which the number of write operations can exceed the number of read operations, that is, limit the capacity of the FIFO.

To address these limitations of dual-port buffer memory devices, single-port buffer memory devices have been developed to, among other things, achieve higher data capacities for a given semiconductor chip size. For example, U.S. Pat. No. 5,546,347 to Ko et al. entitled "Interleaving Architecture And Method For A High Density FIFO", assigned to the present assignee, discloses a memory device which has high capacity and uses relatively small single-port memory cells. However, the use of only single port memory cells typically precludes simultaneous read and write access to data in the same memory cell, which means that single-port buffer memory devices typically have slower fall-through time than comparable dual-port memory devices. Moreover, single-port buffer memory devices may use complicated arbitration hardware to control sequencing and queuing of reading and writing operations.

U.S. Pat. No. 5,371,708 to Kobayashi also discloses a FIFO memory device containing a single-port memory array, a read data register for holding read data from the memory array and a write data register for holding write data to the memory array. A bypass switch is provided for transferring data from the write data register to the read data register so that the memory array can be bypassed during testing of the FIFO to detect the presence of defects therein. However, like the above-described single-port buffer memory devices, simultaneous read and write access to data is not feasible.

Commonly assigned U.S. Pat. Nos. 5,978,307, 5,982,700 and 5,999,478 disclose memory buffers having fast fall-through capability. These memory buffers contain a tri-port memory array of moderate capacity having nonlinear columns of tri-port cells therein which collectively form four separate registers, and a substantially larger capacity supplemental memory array (e.g., DRAM array) having cells therein with reduced unit cell size. The tri-port memory array has a read port, a write port and a bidirectional input/output port. The tri-port memory array communicates internally with the supplemental memory array via the bidirectional input/output port and communicates with external devices (e.g., peripheral devices) via the read and write data ports. Efficient steering circuitry is also provided by a bidirectional crosspoint switch that electrically couples terminals (lines IO and IOB) of the bidirectional input/output port in parallel to bit lines (BL and BLB) in the supplemental memory array during a write-to-memory time interval and vice versa during a read-from-memory time interval. The memory buffers may be tested using the operations described in commonly assigned U.S. Pat. No. 6,173,425.

Commonly assigned U.S. Pat. Nos. 6,546,461 and 6,754,777 also disclose FIFO memory devices that use multiple multi-port caches to support high rate reading operations. These multi-port caches may be coupled to supplemental memories to provide high capacity FIFO memory devices. The supplemental memories may be memories that are embedded with the cache on the same semiconductor substrate, however, external supplemental memories may also be used. Examples of FIFO memory devices that utilize multi-port caches and external memories are illustrated in U.S. Patent Publication Nos. 2004/0019743 and 2004/0047209. These FIFO memory devices also utilize circuits that perform error detection and correction (EDC) operations on data being transferred from an external memory to the multi-port cache.

SUMMARY OF THE INVENTION

Sequential flow-control devices and first-in first-out (FIFO) memory devices utilize a FIFO memory controller circuit to support error detection and correction (EDC) operations and generate a plurality of diagnostic bits that accompany each data word passing through the controller circuit. In some embodiments of the present invention, the diagnostic bits encode an error correction status of a respective data word. In other embodiments of the present invention, the diagnostic bits encode an error correction status and a path traversal status of a respective data word. The path traversal status may identify one of at least two paths a corresponding data word traversed through the memory controller circuit during write and read operations.

In particular, a first-in first-out (FIFO) memory controller circuit may include a cache memory device configured to generate a data word along with a plurality of diagnostic bits that encode an error correction status of the data word and a path traversal status of the data word through the controller circuit. The memory controller circuit further includes an error detection and correction (EDC) circuit, which is coupled to a from_memory port of the cache memory device, and a check bit generation circuit, which is coupled to a to_memory port of the cache memory device. The error detection and correction circuit is configured to provide the cache memory device with the data word along with preliminary diagnostic bits. These preliminary diagnostic bits identify all cases of whether the data word includes a corrected error, an uncorrected error or is without error. Moreover, the plurality of diagnostic bits generated by the cache memory device identifies all cases of whether the data word includes a corrected or uncorrected error, is without error or is unchecked for errors because the data word did not pass through the from_memory port of the cache memory device during a read operation. The controller circuit may also be configured to support a wide word mode whereby the diagnostic bits are replaced by additional data bits during read operations and no error detection and correction operations are performed.

Further embodiments of the present invention include methods of operating an integrated circuit device. These methods include writing first data into a cache memory device within the integrated circuit device and generating check bit data from the first data. The first data and the check bit data is then transferred from the integrated circuit device to a supplemental memory device (e.g., DRAM device) located external to the integrated circuit device. During subsequent operations, the first data and the check bit data is returned from the supplemental memory device to the integrated circuit device. An error checking operation is performed on the returned data. If necessary, an error is corrected in the first data. A first plurality of diagnostic bits are also generated. These diagnostic bits encode an error correction status of the checked first data. The checked first data and the first plurality of diagnostic bits are transferred to the cache memory device. Thereafter, the first data and a second plurality of diagnostic bits, which encode an error correction status of the checked first data, are read from the integrated circuit device. These diagnostic bits may also encode a path traversal status of the first data, which identifies one of a plurality of data paths through the integrated circuit device.

DESCRIPTION OF PREFERRED EMBODIMENTS

Figure 1:
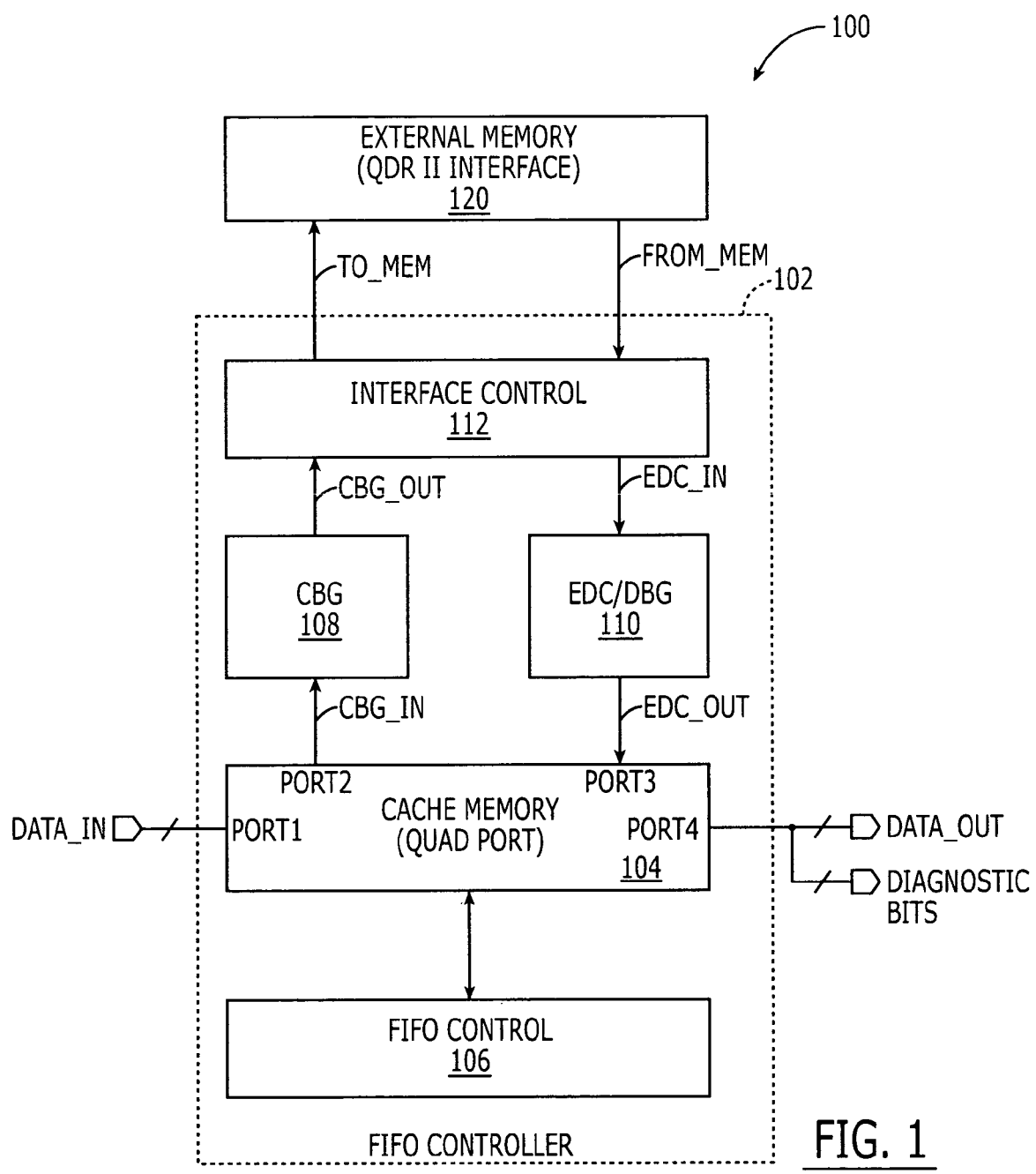
FIG. 1 is a block diagram of a FIFO memory system according to one embodiment of the present invention.

The present invention will now be described more fully herein with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout and signal lines and signals thereon may be referred to by the same reference characters. Signals may also be synchronized and/or undergo minor boolean operations (e.g., inversion) without being considered different signals. The suffix B (or prefix symbol "/") to a signal name may also denote a complementary data or information signal or an active low control signal, for example.

A sequential flow-control device according to an embodiment of the present invention may include the first-in first-out (FIFO) memory system 100 of FIG. 1. This FIFO memory system 100 is illustrated as including a FIFO memory controller 102 and an external memory device 120. This external memory device 120 may be a high capacity supplemental memory device. A typical supplemental memory device may include at least one dynamic random access memory (DRAM) chip having a QDR II interface. Other types of external memory devices may also be used. The FIFO memory controller 102 may operate to support a single queue or multiple queues (e.g., 128) within the FIFO memory system 100. The FIFO memory controller 102 is illustrated as including a cache memory device 104, which operates under control of a FIFO control circuit 106. The cache memory device 104 is illustrated as having a quad-port configuration. The first port (PORT 1) is configured to receive write data from a data input port of the FIFO memory controller 102. The second port (PORT 2), which is treated herein as a "to_memory" port, is configured to pass data from the cache memory device 104 to a check bit generation (CBG) circuit 108. The third port (PORT 3), which is treated herein as a "from_memory" port, is configured to receive data and first diagnostic bits (e.g., preliminary diagnostic bits) from an error detection and correction/diagnostic bit generation (EDC/DBG) circuit 110. The fourth port (PORT) is configured to pass read data and second diagnostic bits (e.g., final diagnostic bits) to a data output port of the FIFO memory controller 102. These second diagnostic bits may augment the information provided by the first diagnostic bits received at the third port of the cache memory device 104. The FIFO memory controller 102 may support a wide word configuration. In this configuration, the first and second diagnostic bits are replaced with additional data bits, check bit generation operations are suspended during FIFO write operations and error detection and correction operations are suspended during FIFO read operations.

The check bit generation (CBG) circuit 108 supports a plurality of modes of operation. One of these modes includes a bypass mode, which operates to pass data from an input (CBG_IN) to an output (CBG_OUT) of the CBG circuit 108 without alteration. The bus widths of the input CBG_IN and output CBG_OUT of the CBG circuit 108 may equal 72 bits. As illustrated, the output CBG_OUT of the CGB circuit 108 is electrically coupled to an interface control circuit 112, which controls transfer of data to and from the external memory device 120. This transfer of data may be synchronized with rising and falling edges of a clock signal. The bypass mode is typically enabled when the FIFO memory controller 102 is supporting a wide word configuration (e.g., x36, x18 and x9 data input widths). This wide word configuration may preclude performance of check bit generation and error detection and correction operations on data passing through the FIFO memory controller 102. When this wide word configuration is enabled, the CBG circuit 108 may operate in a x72 data mode with no check bit generation. The CBG circuit 108 also supports an active mode. In this active mode, the CBG circuit 108 computes a plurality of check bits for each data word(s) received at the input (CBG_IN) of the CBG circuit 108. These check bits may be generated using a conventional Hamming code algorithm. This active mode is typically enabled when the FIFO memory controller 102 is supporting x32, x16 or x8 data input widths and the CBG circuit 108 is configured to generate eight (8) check bits for each 64 bit data word received at the input CBG_IN.

The error detection and correction/diagnostic bit generation (EDC/DBG) circuit 110 also supports a plurality of modes of operation. One of these modes includes a bypass mode, which operates to pass data from an input (EDC_IN) to an output (EDC_OUT) of the EDC/DBG circuit 110 without alteration. This input EDC_IN, which is electrically coupled to the interface control circuit 112, has a bus width of 72 bits. This bypass mode is typically enabled when the FIFO memory controller 102 is supporting a wide word configuration (e.g., x36, x18 and x9 data input widths). When this wide word configuration is enabled, the EDC/DBG circuit 110 may operate in a x72 mode with no error detection and correction operations being performed on the data received at the input EDC_IN and no diagnostic bits being generated at the output (EDC_OUT), which also has a bus width of 72 bits. The EDC/DBG 110 also supports an active mode. In this active mode, the EDC/DBG 110 performs error detection and correction operations on each x64 data word and corresponding x8 bits of check data received at the input EDC_IN and also generates at least one diagnostic bit vector (DBV). Depending on the selected data width, the x64 data word will represent two x32 words, four x16 words or eight x8 words. If the x32 data width is selected, then the EDC/DBG 110 will generate a pair of x32 words and two equivalent x4 diagnostic bit vectors. These x4 diagnostic bit vectors (x4 DBV) encode an error correction status of the x64 data word processed by the EDC/DBG 110. In particular, the x4 DBVs may equal (0001) to represent no error in the x64 data word, or (0010) to represent a corrected single bit error in the x64 data word, or (0100) to represent uncorrected multiple bit errors in the x64 data word. Alternatively, a x4 DBV equal to (0010) may represent the presence of a corrected single bit error in the x64 data word or a single bit error in the check bits associated with the x64 data word. Accordingly, if the x32 data width is selected, the output EDC_OUT of the EDC/DBG 110 will be formatted as follows:

EDC_OUT<0:31>=first x32 word;

EDC_OUT<32:35>=x4 DBV;

EDC_OUT<36:67>=second x32 word; and

EDC_OUT<68:71>=x4 DBV.

However, if the x16 data width is selected, then the EDC/DBG 110 will generate a four x16 words and four equivalent x2 diagnostic bit vectors. These x2 diagnostic bit vectors (x2 DBV) encode an error correction status of the x64 data word processed by the EDC/DBG 110. In particular, the x2 diagnostic bit vectors may equal (01) to represent no error in the x64 data word, or (10) to represent a corrected single bit error in the x64 data word, or (11) to represent uncorrected multiple bit errors in the x64 data word. Alternatively, a x2 DBV equal to (10) may represent the presence of a corrected single bit error in the x64 data word or a single bit error in the check bits associated with the x64 data word. Accordingly, if the x16 data width is selected, the output EDC_OUT of the EDC/DBG 110 will be formatted as follows:

EDC_OUT<0:15>=first x16 word;

EDC_OUT<16:17>=x2 DBV;

EDC_OUT<18:33>=second x16 word;

EDC_OUT<34:35>=x2 DBV;

EDC_OUT<36:51>=third x16 word;

EDC_OUT<52:53>=x2 DBV;

EDC_OUT<54:69>=fourth x16 word; and

EDC_OUT<70:71>=x2 DBV.

Finally, if the x8 data width is selected, then the EDC/DBG 110 will generate a eight x8 words and eight equivalent x1 diagnostic bit vectors. These x1 diagnostic bit vectors (x1 DBV) encode an error correction status of the x64 data word processed by the EDC/DBG 110. In particular, the x1 diagnostic bit vectors may equal (0) to represent no error in the x64 data word or a corrected single bit error and (1) to represent multiple uncorrected errors. Accordingly, if the x8 data width is selected, the output EDC_OUT of the EDC/DBG 110 will be formatted as follows:

EDC_OUT<0:7>=first x8 word;

EDC_OUT<8>=x1 DBV;

EDC_OUT<9:16>=second x8 word;

EDC_OUT<17>=x1 DBV;

EDC_OUT<18:25>=third x8 word;

EDC_OUT<26>=x1 DBV;

EDC_OUT<27:34>=fourth x8 word;

EDC_OUT<35>=x1 DBV;

EDC_OUT<36:43>=fifth x8 word;

EDC_OUT<44>=x1 DBV;

EDC_OUT<45:52>=sixth x8 word;

EDC_OUT<53>=x1 DBV;

EDC_OUT<54:61>=seventh x8 word;

EDC_OUT<62>=x1 DBV;

EDC_OUT<63:70>=eighth x8 word; and

EDC_OUT<71>=x1 DBV.

Figure 2:
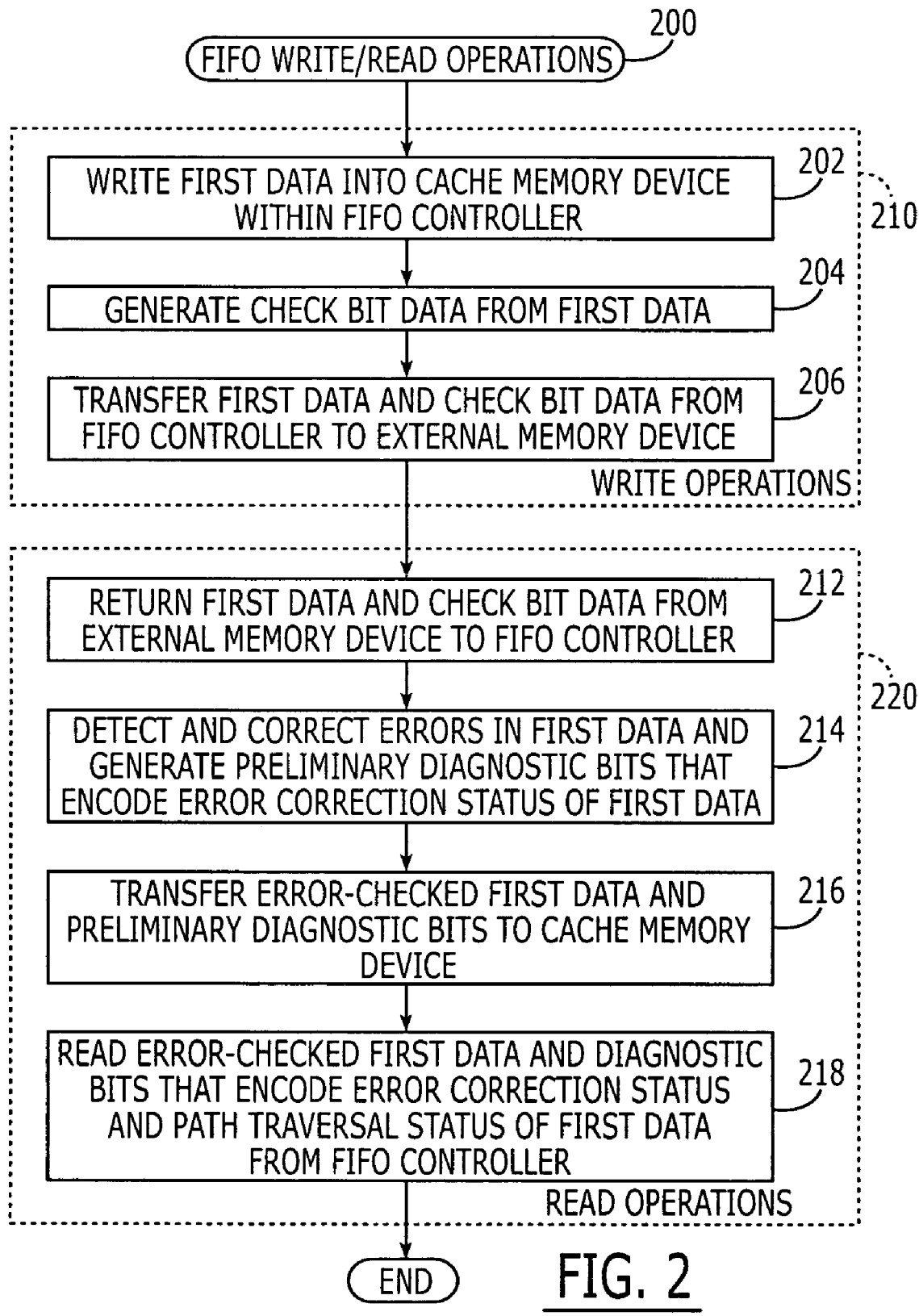
FIG. 2 is a flow diagram that illustrates operations performed by the FIFO memory system of FIG. 1.

The above-described operations will now be described more fully with reference to the flow diagram of FIG. 2, which illustrates one example of a FIFO write operation 210 followed by a FIFO read operation 220 of the same data. In particular, these FIFO write/read operations 200 include writing first data (e.g., x64 data word as two x32 words, four x16 words or eight x8 words) into the cache memory device 104 within the FIFO controller 102, Block 202. During this write operation 202, the first data passes from an input port of the FIFO controller 102 to a first port (PORTT 1) of the cache memory device 104. During following operations, the first data is transferred out through the second port (PORTT 2) of the cache memory device 104 and into the check bit generation circuit 108. The check bit generation circuit 108 generates a plurality of check bits (e.g., x8 syndrome word) from the first data, Block 204, and then the first data and check bit data are transferred to the interface control circuit 112 and then to the external memory 120 via the TO_MEM bus, Block 206.

Thereafter, in response to issuance of a read command to the FIFO controller 102, the first data and corresponding check bit data is returned from the external memory 120 to the FIFO controller 102, Block 212. This returned data is then passed from the interface control circuit 112 to the EDC/DBG circuit 110. The EDC/DBG circuit 110 may operate to detect any single or multiple bit error in the first data and also correct any single bit error in the first data. The EDC/DBG circuit 110 transfers the first data (and any corrected error therein) and corresponding diagnostic bit vectors (e.g., two equivalent x4 DBVs, four equivalent x2 DBVs or eight equivalent x1 DBVs) to the third port (PORT 3) of the cache memory device 104, Block 216. As described above, these diagnostic bit vectors (DBVs) encode an error correction status of the first data received by the EDC/DBG circuit 110. In alternative embodiments, the EDC/DBG circuit 110 may be configured to generate unique DBVs for each x8, x16 or x32 data word passed to the third port of the cache memory device 104. In such embodiments, the CBG circuit 108 will need to be configured to generate unique check bits (e.g., unique syndrome words) for each of the x8, x16 or x32 data words received from the cache memory device 104.

Referring now to Block 218, the error-checked first data and diagnostic bits (in the form of DBVs) are then transferred from a fourth port (PORT 4) of the cache memory device 104 to an output port of the FIFO controller 102 to complete the read operation. Here, the x8, x16 or x32 words, which are derived from the x64 data word processed by the EDC/DBG circuit 110, and corresponding DBVs may be provided in a serial sequence on a corresponding x9, x18 or x36 output bus. As described above, the diagnostic bit vectors DBVs may be two equivalent four bit vectors when the FIFO controller 102 is configured to support a x32 data width or four equivalent two bit vectors when the FIFO controller 102 is configured to support a x16 data width or eight equivalent one bit vectors when the FIFO controller 102 is configured to support a x8 data width.

These DBVs generated at the output port of the FIFO controller 102 may also encode a path traversal status of the corresponding data words. In particular, the cache memory device 104 may be configured to generate DBVs (at PORT 4) that identify whether the read data was passed directly from the first port (PORT 1) to the fourth port (PORT 4) of the cache memory device 104 using a direct bypass path within the cache memory device 104. In such cases, the DBVs at the output port of the FIFO controller 102 will reflect the fact that the FIFO read data passed directly through the cache memory device 104 and did not undergo a write/read cycle to and from the external memory 120 or any error checking operation within the EDC/DBG circuit 110. To reflect this traversal of the direct path within cache memory device 104, the DBVs are set to all zeros (i.e., DBV=(0000) for x32 word width or (O) for x16 word width or (O) for x8 word width). This passing of the data directly through the cache memory device 104 can automatically occur whenever the FIFO memory system 100 is at or near an empty boundary and it becomes necessary that the write data received at the first port (PORT 1) be passed to the fourth port (PORT 4) where it is available for immediate reading. Establishment of this direct path may also operate to block transfer of read data (and DBVs) into the third port (PORT 3). Further aspects of the direct path within the cache memory device 104 and the FIFO control circuit 106 may be as described in commonly assigned U.S. Pat. Nos. 6,546,461 and 6,754,777 and in U.S. Patent Publication Nos. 2004/0019743 and 2004/0047209, the disclosures of which are hereby incorporated herein by reference.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A first-in first-out (FIFO) memory controller circuit, comprising:
    an error detection and correction and diagnostic bit generation (EDC/DBG) circuit configured to convert a x2N combined data word and check bit data associated with the x2N combined data word into a first plurality of distinct xN data words and a corresponding first plurality of equivalent diagnostic bit vectors (DBVs) that encode an error correction status of the x2N combined data word; and
    a cache memory device configured to pass the first plurality of distinct xN data words and the corresponding first plurality of equivalent DBVs from an input data port of said cache memory device to an output data port of said cache memory device during a read operation.

2. The controller circuit of claim 1, wherein said cache memory device is further configured to respond to a first empty condition during a read operation by generating a second plurality of distinct data words and a corresponding second plurality of equivalent diagnostic bit vectors that reflect the fact that the second plurality of distinct data words did not undergo a write/read cycle to and from an external memory or an error checking operation within said EDC/DBG circuit.

3. The controller circuit of claim 2, wherein said cache memory device is a quad-port cache memory device having a write port, a to_memory port, a from_memory port and a read port.

4. The controller circuit of claim 1, wherein said cache memory device is a quad-port cache memory device having a write port, a to_memory port, a from_memory port and a read port.

5. A method of operating an integrated circuit device, comprising the steps of:
    writing first data into a cache memory device within the integrated circuit device;
    generating check bit data from the first data;
    transferring the first data and the check bit data from the integrated circuit device to a supplemental memory device located external to the integrated circuit device;
    returning the first data and the check bit data from the supplemental memory device to the integrated circuit device;
    checking the first data and the check bit data for errors and, if necessary, correcting an error in the first data;
    generating a first plurality of diagnostic bits that encode an error correction status of the checked first data;
    transferring at least a first portion of the checked first data and the first plurality of diagnostic bits in parallel to the cache memory device;
    reading the at least a first portion of the checked first data and the first plurality of diagnostic bits in parallel from the integrated circuit device.

6. The method of claim 5, further comprising the step of reading at least a second portion of the checked first data and the first plurality of diagnostic bits in parallel from the integrated circuit device.

* * * * *